A. VON SCHRENK.
MECHANICAL MOVEMENT.
APPLICATION FILED JAN. 5, 1917.

1,291,664.

Patented Jan. 14, 1919.
2 SHEETS—SHEET 2.

Inventor
Arnold Von Schrenk

UNITED STATES PATENT OFFICE.

ARNOLD von SCHRENK, OF ST. LOUIS, MISSOURI.

MECHANICAL MOVEMENT.

1,291,664.  Specification of Letters Patent.  Patented Jan. 14, 1919.

Application filed January 5, 1917. Serial No. 140,791

*To all whom it may concern:*

Be it known that I, ARNOLD VON SCHRENK, a citizen of the United States, residing at the city of St. Louis, State of Missouri, have invented a certain new and useful Improvement in Mechanical Movements, of which the following is a full, clear, and exact description, such as will enable others skilled in the art to which it appertains to make and use the same, reference being had to the accompanying drawings, forming part of this specification, in which—

This invention relates to a new and useful improvement in mechanical movements, the object being to utilize power delivering devices operating upon a floating lever, whereby by adjusting the variable fulcrum the forces of the power delivering devices may be brought to exert their energy or energies in one direction or another in the performance of work. It is possible by this arrangement to utilize the stored-up energies in the power delivering devices by the exercise of only a small amount of power necessary to vary the position of the fulcrum relative to the floating lever.

While in the following description, I have described my improved mechanical movement as being applied to brake systems, it is evident that my invention may be utilized in connection with many other devices wherever it is desired to apply a relatively greater force by the application of a smaller controlling power.

It will be also obvious from the accompanying drawings that, while I have shown major and minor forces in the form of springs or air cylinders possessing relatively great and small power, the two forces operating upon opposite ends of the floating lever may be the same. The means connecting the floating lever to the part to be operated is preferably connected to that end of the floating lever which is operated by the major power delivering devices, where such is used, whereby when the variable fulcrum is moved, such major power will be applied in proportion to the position of the fulcrum. While one end of the lever is shown as applying force in one direction, as in the application of brakes, it is obvious that the opposite end of the lever could be connected to the device or devices which would be operated thereby.

Figure 1:
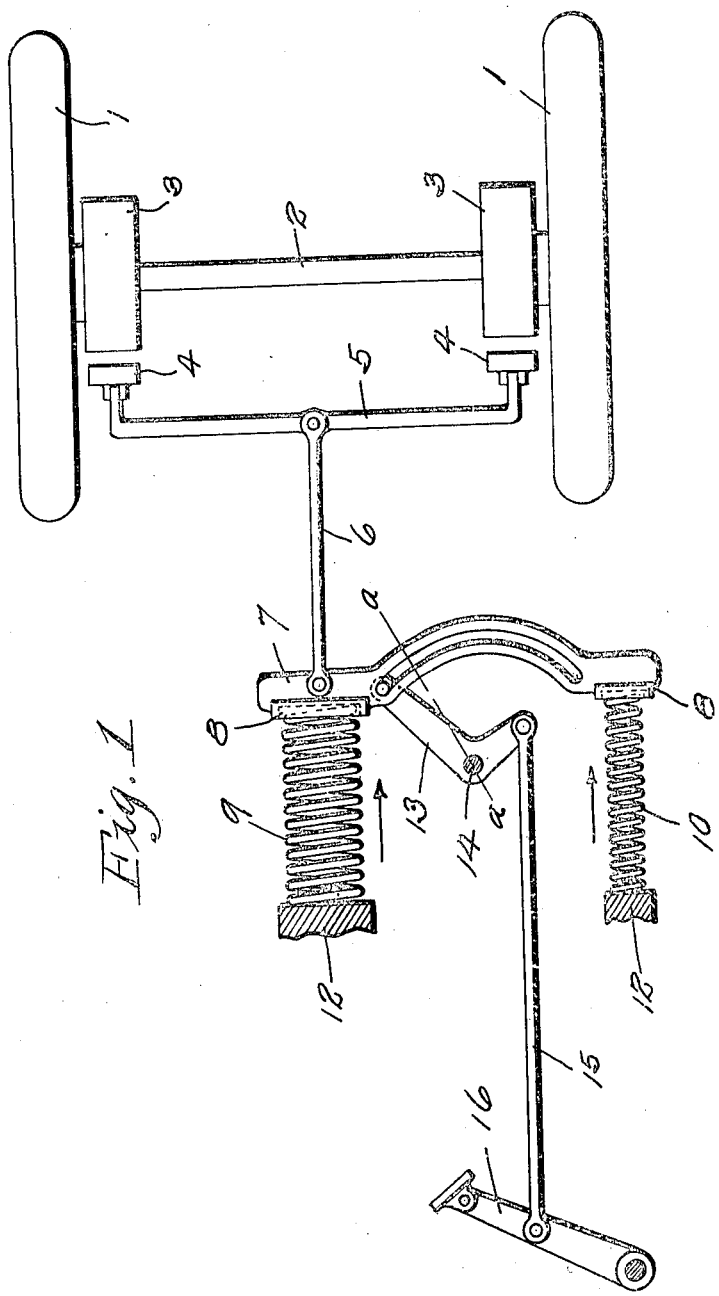
Figure 1 is a diagrammatic view of my improved mechanical movement applied as an automobile brake.

In Fig. 1, I have shown an application of my improved mechanical movement to an automobile brake, in which 1 indicates the wheels, 2 the axle, 3 the braking surface, 4 are the brake shoes coöperating with the braking surfaces and connected together by means of a beam 5. 6 is a link connected to the brake lever at one end and at its opposite end to a floating lever 7. This floating lever carries spring seats 8 at each end, and for purposes of illustration, we will assume that the spring 9 bearing against the spring seat opposite the link 6 is three times as powerful as the spring 10 bearing against the opposite end of the lever. Springs 9 and 10 are seated against fixed supports 12 and lever 7 is provided with a slot or cam face with which coöperates a roller on a bell crank lever 13 having a fixed pivot point 14. A rod 15 connects the bell crank lever with a foot-power lever 16.

If the spring 9 is three times as powerful as the spring 10, and both of which springs are under compression, exerting their energies in the direction of the arrows, it will be obvious that if the fulcrum on the bell crank 13 is one-fourth the distance between the springs, the floating lever will be evenly balanced. This position of equilibrium established by the floating fulcrum is indicated by the line *a—a*. When the floating fulcrum is moved to one side of this line, as indicated by full lines in Fig. 1, then the spring 9 is overbalanced by the exertion of spring 10, and the brake shoes 4 are withdrawn. However, when the floating fulcrum moves toward the right past the line *a—a*, the spring 9 asserts its power and will operate through link 6 upon the brake lever to apply the brakes, the application of power upon the brakes being proportionate to the position of the movable fulcrum, that is to say, the pressure on link 6 is gradually increased as the distance between line *a—a* and the point of engagement of the floating fulcrum with the lever 7, increases.

Figure 2:
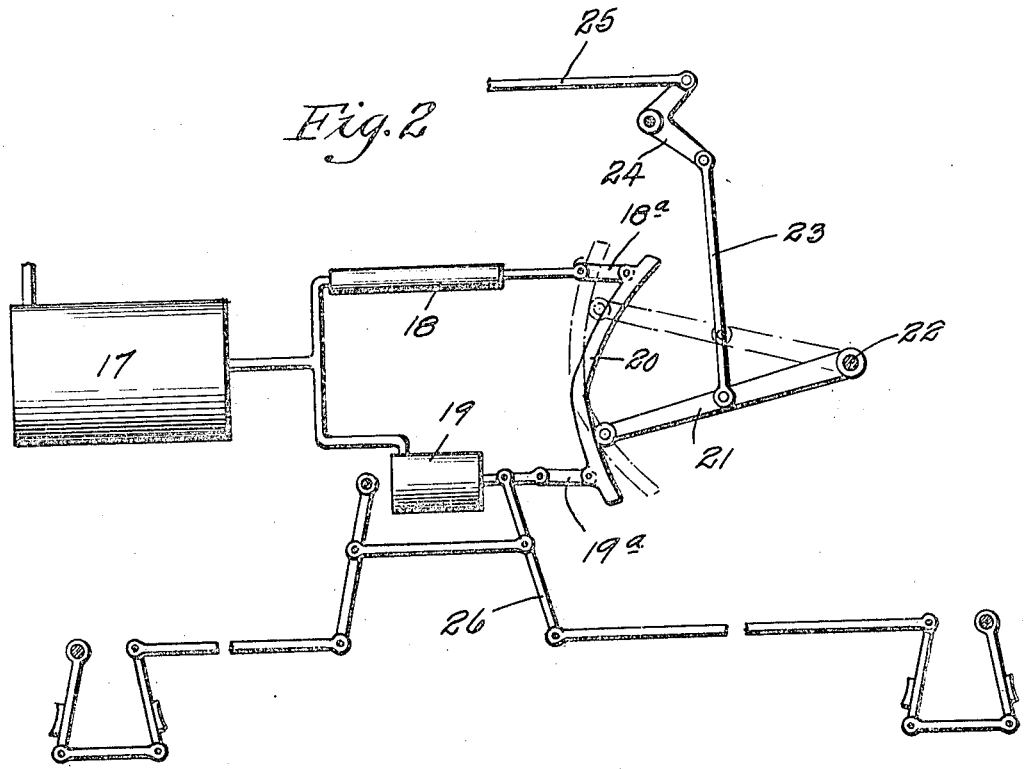
Fig. 2 is a similar view showing my improved mechanical movement as applied to a railway car brake.

In Fig. 2, I have shown my improved mechanical movement as applied to car brakes, in which 17 indicates a brake cylinder which may have the usual connection to the locomotive and which is connected by suitable pipes to a small cylinder 18 and a larger cylinder 19 corresponding to the springs above referred to. These cylinders contain pistons which are connected by links 18ª and 19ª to a floating lever 20, the movable fulcrum of which is controlled by means of the lever 21 carrying a roller bearing upon the floating lever. This lever 21 has a fixed fulcrum 22 and is controlled by the link 23 connected to the bell crank 24 to which is connected a link 25 controlled by the motorman, as in street car service. The cylinder 19, or rather the piston rod arranged therein, is connected to a lever 26 which may form one of the primary levers of an ordinary brake system.

Figure 3:
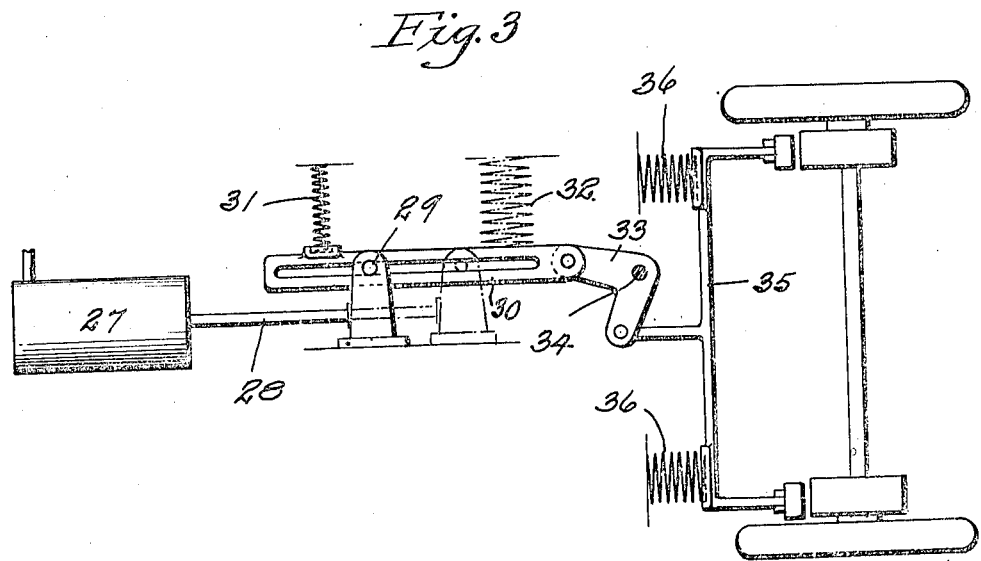
Fig. 3 is a modified form of my improved mechanical movement as applied to an automobile brake.

In Fig. 3, I have shown an air cylinder 27 containing a piston to which is connected a rod 28 carrying a movable fulcrum 29 operating in or under a floating lever 30, on the opposite ends of which bear a spring 31 and a spring 32. This floating lever coöperates with a bell crank lever 33 having a fixed fulcrum 34 and connected to a brake beam 35, which brake beam has springs 36 bearing upon its opposite ends which may assist in applying the brakes. In this form, the spring 32 is assisted by the springs 36 in applying the power.

In this form of my invention, springs 31 and 32 may exert an equal pressure on the lever 30 in which event, if we disregard the springs 36, the point of equilibrium between the springs would be established when the fulcrum 29 is equidistant between the springs. Moving the fulcrum to one side or the other, would cause the lever 30 to be overbalanced and moved in one direction or the other. Assuming, for the purpose of illustration, that the spring 32 is assisted by the springs 36, and the point of equilibrium is indicated by the position of fulcrum 29, as indicated by dotted lines, the movement of said fulcrum leftwardly will permit the springs 32 and 36 to act; the continued active movement of the fulcrum 29 eventually passing the point of reaction of spring 31, causing spring 31 to join its stored-up energy in coöperation with the energies of the other springs, and consequently, the stored-up energies of all of the springs, would be brought into action in performing the work to be done. It is obvious that a single spring, such as 31, could be employed both to apply the power and release the power applying connections. In such construction, the springs 32 and 36 could be dispensed with and the fulcrum 29 so operated that it would move first to one side and then the other of the point of reaction of the spring 31. In such construction, as shown in Fig. 3, moving the fulcrum 29 to the left of spring 31, will cause the brakes to be applied, whereas, moving said fulcrum 20 to the right of spring 31 will cause the brakes to be released.

What I claim is:

1. A mechanical movement comprising a plurality of power delivering devices, a floating lever upon which said power delivering devices exert their energies, a variable fulcrum for said floating lever, and means for varying the position of said fulcrum.

2. In a mechanical movement, the combination of a floating lever, a movable fulcrum therefor, means for moving said fulcrum, power delivering devices whose energies are directed against the opposite ends of said lever, and a connecting rod or link which is operated by one end of said floating lever.

3. A mechanical movement comprising power delivering devices, a lever to which said devices are connected to apply their power at different points, a fulcrum for the lever shiftable relative to the points of power delivery to vary the relative effectiveness of the power delivering devices on said lever, a part to be operated, and means for transmitting the power from the lever to a part to be operated.

4. A mechanical movement comprising major and minor power delivering devices, a floating lever, a variable fulcrum for said lever, means for shifting said fulcrum, and means for transmitting power from the lever to a part to be operated.

5. A mechanical movement comprising power delivering devices, a lever to which said devices are connected at different points, a fulcrum for the lever shiftable relative to the points of power delivery to vary the relative effectiveness of said power delivering devices on said lever, means for shifting said fulcrum to each side of the point of equilibrium of said lever, whereby when said fulcrum is moved to one side of said point of equilibrium, one of said power delivering devices will preponderate to move said lever in one direction, and when said fulcrum is moved to the other side of said point of equilibrium, said lever will be moved in the opposite direction.

6. A mechanical movement comprising two power delivering devices, a lever with which said devices are connected at different points, a fulcrum for said lever located between said points and relatively movable to vary the distance between the fulcrum and said points, means for effecting such relative movement of said fulcrum and lever, and a power transmitting member connected with said lever.

7. A mechanical movement comprising two power delivering devices, a lever with which said devices are connected at different points, a fulcrum for said lever, means for effecting relative movement of the said parts to vary the distance between the fulcrum and said points, and a power transmitting member connected with said lever.

8. A mechanical movement comprising a power delivering device, a lever with which said device is connected, a fulcrum for said lever, means for effecting relative movement of said parts to vary the distance between the fulcrum and the point at which the lever is connected with the power delivering device, and a power transmitting member connected with said lever.

9. A mechanical movement comprising two power delivering devices, a lever with which said devices are connected at different points, a fulcrum for said lever, means for effecting relative movement of said lever and fulcrum to vary the distance between the fulcrum and said points, the said lever being formed, at each side of the point of equilibrium, with a guide or track which is parallel to the path of the fulcrum relatively to the lever, when the lever is in the respective tilted position, and a power transmitting member connected with said lever.

In testimony whereof I hereunto affix my signature in the presence of two witnesses, this 3d day of January, 1917.

ARNOLD von SCHRENK.

Witnesses:
M. P. SMITH,
M. A. HANDEL.